(12) United States Patent
Hoffmann

(10) Patent No.: US 7,703,495 B2
(45) Date of Patent: Apr. 27, 2010

(54) COMPACT FIBER PLACEMENT APPARATUS AND METHOD OF MAKING AND USING SAME

(75) Inventor: Klaus Hoffmann, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 915 days.

(21) Appl. No.: 11/510,165

(22) Filed: Aug. 25, 2006

(65) Prior Publication Data

US 2007/0044919 A1  Mar. 1, 2007

Related U.S. Application Data

(60) Provisional application No. 60/711,290, filed on Aug. 25, 2005.

(51) Int. Cl.
B65H 81/00 (2006.01)

(52) U.S. Cl. .................. 156/433; 156/425; 156/441

(58) Field of Classification Search ................ 156/169, 156/173, 175, 425, 433, 441
See application file for complete search history.

(56) References Cited

U.S. PATENT DOCUMENTS 5,584,621 A  12/1996  Bertsche et al.
5,761,965 A *  6/1998  Dahlquist ................ 74/490.03
7,353,853 B2 *  4/2008  Borgmann et al. .......... 156/433

FOREIGN PATENT DOCUMENTS

| EP | 1719610 A1 | 11/2006 |
| WO | WO 2004/101413 A2 | 11/2004 |
| WO | WO 2005/105415 A2 | 11/2005 |

OTHER PUBLICATIONS

IBM Technical Disclosure Bulletin, Dec. 1, 1984, "Three Axis Wrist Drive", ACC-No. NA84124103.*

* cited by examiner

*Primary Examiner*—Jeff H Aftergut
(74) *Attorney, Agent, or Firm*—Reinhart Boerner Van Deuren P.C.

(57) ABSTRACT

A compact fiber placement apparatus includes a fiber placement head, an articulated wrist apparatus, and a wrist mounting adapter for connecting the compact fiber placement apparatus to a fiber placement machine. The components of the compact fiber placement apparatus are operatively connected to one another by a wrist rotation torque motor, a head rotation torque motor, and a wrist pivot torque motor, to provide pivoting and rotating motion. A redirect arrangement includes a pivot redirect element driven by the wrist rotation torque motor at one half of the rotational speed at which a first and second wrist element of the articulated wrist apparatus pivot with respect to one another.

21 Claims, 11 Drawing Sheets

COMPACT FIBER PLACEMENT APPARATUS AND METHOD OF MAKING AND USING SAME

CROSS-REFERENCE TO RELATED PATENT APPLICATIONS

This patent claims the benefit of U.S. Provisional Patent Application No. 60/711,290, filed Aug. 25, 2005, the disclosure and teachings of which are incorporated herein, by reference, in their entireties.

FIELD OF THE INVENTION

This invention relates to the forming of composite structures with automated fiber placement machines, and more particularly to fiber placement heads and articulated support structures for use in such fiber placement machines.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips, commonly known as "tows." Individual tapes or tows are manipulated by the fiber placement machine to form a band of material that is deposited onto a tool. Parts are built up layer-by-layer, with tapes or tows of composite material, with the angle at which each layer "ply" is laid onto the tool being precisely determined by the fiber placement machine.

Automated fiber placement enables the construction of complex composite structures having steered or curvilinear fiber paths. This method of producing composite structures is more cost effective than manual methods. It provides an improved structural efficiency due to its ability to orient the fibers along local internal loads paths, which potentially results in lighter structures and lower cost than in structures made by other production methods.

In order to provide maximum flexibility of use, it is desirable that a fiber placement head and a support structure for the fiber placement head be as compact as possible. This is particularly true, where it is desirable to fabricate structures having concave sections into which the fiber placement head must descend during fabrication of the part.

For maximum speed of fiber placement, it is desirable to be able to perform bi-directional fiber placement. To perform bi-directional fiber placement, it is necessary that the fiber placement head be capable of almost instantaneously cutting the tows at an edge of the part, and flipping around to an opposite orientation for laying tows in an opposite direction across the part.

It is also desirable that both the fiber placement head and support structure for the fiber placement head be a compact, rugged simple construction, and allow maximum access for threading the multiple tows of fiber through the support structure and placement head.

BRIEF SUMMARY OF THE INVENTION

In one form of the invention, a compact fiber placement apparatus includes a fiber placement head, and/or support structure therefor, having one or more torque motors for positioning the fiber placement head. The torque motors may be constructed with a hollow core for passage therethrough of multiple tows of material. Use of torque motors, in accordance with the invention, allows a fiber placement head and/or support structure therefor to be smaller than prior heads and support structures in which the head was positioned by motors driving through mechanical drive trains, having gears, pulleys, chains, etc. Use of the torque motor also provides for significantly faster positioning and repositioning of the head, than was achievable with prior drive arrangements.

A compact fiber placement apparatus, according to the invention, may take the form of an articulated support structure, for a fiber placement head, including a first mounting element having a base configured for rotatable attachment to a fiber placement machine, a second mounting element having a base thereof configured for rotatable attachment thereto of a fiber placement head, with the first and second mounting elements being pivotably attached to one another in such a manner that pivoting the mounting elements with respect to one another changes a relative angle between axes of rotation extending through the first and second bases of the first and second mounting elements respectively. The first and second mounting elements may take the form of mounting forks having the pivoting connection between the first and second mounting elements formed by joining corresponding pairs of fork arms of the first and second mounting elements. In some forms of the invention, one pair of fork arms may be eliminated, to provide improved access for routing filament tows between the bases of the first and second mounting elements.

The bases of the first and second mounting elements, of an articulated mounting structure, according to the invention, may provide openings therethrough, for passage of filament tows between the filament placement machine and the fiber placement head.

A compact fiber placement apparatus, according to the invention, may include redirect elements operatively attached to either or both of the first and second mounting elements.

An articulating support structure, according to the invention, may include one or more torque motors, for operatively connecting either or both of the first and second bases to the fiber placement machine and/or the fiber placement head, respectively. Torque motors at either or both of the bases of the first and second mounting elements may be annular shaped, including a central opening for passage therethrough of multiple fiber tows.

A torque motor may also be operatively coupled between the first and second mounting elements to provide pivoting motion between the first and second mounting elements.

A compact fiber placement apparatus, according to the invention, may include a fiber placement head, and a head rotation torque motor. The head rotation torque motor may have a rotatable member thereof, defining a rotational axis of the rotatable member of the head rotation torque member, and an opening passing axially through the head rotation torque motor and disposed about the rotational axis of the rotatable member. The fiber placement head may include a fiber placement head frame, having a mounting plate thereof which is adapted for fixed attachment to the rotatable member of the head rotation torque motor. The mounting plate of the fiber placement head frame may have a hole extending therethrough, with the hole being substantially aligned with the opening in the rotatable member of the head rotation torque motor, when the fiber placement head frame is attached to the rotatable member of the head rotation torque motor.

A compact fiber placement apparatus, according to the invention, may also include an articulated wrist mounting apparatus, having a first and a second wrist element thereof, operatively connected to one another, and adapted for operatively connecting a fiber placement head to a fiber placement machine. The first wrist element may have a base thereof adapted for rotatable operative attachment to the fiber placement machine, with the base of the first wrist element defining a mounting surface of the first wrist element which is adapted for mating with a corresponding mating surface of the fiber placement machine. The first wrist element may also define a rotational axis of the first wrist element extending substantially perpendicularly to the mounting surface of the base of the first wrist element.

The second wrist element may have a base thereof adapted for operative rotatable attachment thereto of the fiber placement head, with the base of the second wrist element defining a mounting surface of the second wrist element which is adapted for mating with a corresponding mating surface of the fiber placement head. The second wrist element also defines a rotational axis of the second wrist, extending substantially perpendicularly to the mounting surface of the base of the second wrist element.

The first and second wrists may be pivotably attached to one another along a common pivot axis of the wrist elements, extending orthogonally to the rotational axes of the first and second wrist elements, in such a manner that, when the wrist elements are positioned with their respective mounting surfaces extending parallel to one another, the rotational axis of the first wrist element is substantially coincident with the rotational axis of the second wrist element. By virtue of this arrangement, as the first and second wrist elements are pivoted to a wrist pivot angle, with respect to one another, about the common pivot axis, the rotational axes of the first and second wrist elements continue to intersect one another and the pivot axis, with the relative angle between the rotational axes of the first and second wrist elements matching the pivot angle.

The base of each of the first and second wrist elements may include an opening passing therethrough, about the rotational axes, and adapted for passage therethrough of a plurality of fiber tows.

A compact fiber placement apparatus, according to the invention, may include a head rotation torque motor having first and second members thereof operatively connected for rotation relative to one another about a head rotation torque motor axis extending substantially coincident with the rotational axis of the second wrist element. The first member of the head rotation torque motor may be fixedly attached to the base of the second wrist element, and the second member of the head rotation torque motor may be adapted for fixed attachment thereto of a fiber placement head.

A compact fiber placement apparatus, according to the invention, may include a wrist rotation torque motor, having first and second members thereof operatively connected for rotation relative to one another about a wrist rotation torque motor axis extending substantially coincident with the rotational axis of the first wrist element. The first member of the wrist rotation torque motor may be fixedly attached to the base of the first wrist element, and the second member of the wrist rotation torque member may be adapted for fixed attachment to the fiber placement machine.

The base of each of the first and second wrist elements may include an opening passing therethrough, about the rotational axis and adapted for passage therethrough of a plurality of fiber tows. Each of the head and wrist rotation torque motors may include an opening passing therethrough, about the rotational axes, and adapted for passage therethrough of the plurality of fiber tows passing through the openings in the bases of the first and second wrist elements.

A compact fiber placement apparatus, according to the invention, may include a pivot drive element, operatively connected between the first and second wrist elements, for applying a pivoting torque to the first and second wrist elements about the common pivot axis of the wrist elements. The pivot drive element may include a pivot torque motor, having first and second members thereof operatively connected for rotation relative to one another about a pivot torque axis extending substantially coincident with the common pivot axis. The first member of the pivot torque member may be fixedly attached to the first wrist element, and the second member of the pivot torque motor may be fixedly attached to the second wrist element.

The first and second wrist elements, in a compact fiber placement apparatus according to the invention, may be generally L-shaped, single-tined, forks having a support arm extending substantially perpendicularly from their respective bases, with the distal ends of the support arms being operatively rotatably joined for rotation of the first and second wrist elements about the common pivot axis. In a compact fiber placement apparatus having generally L-shaped first and second wrist elements, the compact fiber placement apparatus may include a first and a second removable support arm, each having an attachment end and a distal end thereof, with the distal ends thereof being operatively attached to one another for independent pivotable movement of the first and second removable side arms, with respect to one another, about the common pivot axis. The first removable support arm may have the attachment end thereof adapted for removable attachment to the base of the first wrist element, opposite, and spaced from the support arm of the first wrist element along the pivot axis. The second removable support arm may have the attachment end thereof adapted for removable attachment to the base of the second wrist element, opposite, and spaced from the support arm of the second wrist element along the pivot axis.

In some forms of the invention, a pivot drive element of a wrist apparatus, according to the invention, may include a pivot torque motor, having first and second members thereof operatively connected for rotation relative to one another about a pivot torque motor axis extending substantially coincident with the common pivot axis. The first member of the pivot torque motor may be fixedly attached to the first wrist element, and the second member of the pivot torque motor may be fixedly attached to the second wrist element.

In some forms of the invention, a redirect arrangement may be operatively connected to the wrist apparatus. The redirect arrangement may include a wrist pivot angle redirect arrangement, including a guide which is operatively mounted along the common pivot axis, for directing a plurality of fiber tows passing through the wrist apparatus in such a manner that: when the rotational axes of the first and second wrist elements are coincident, at a pivot angle of 0°, no angular redirection of the tows is provided about the pivot axis; and, when the rotational axes are not coincident, at a non-zero pivot angle, the fiber tows are angularly redirected about the pivot axis through a pivot redirect angle substantially equal to the non-zero pivot angle.

A pivot angle redirect drive apparatus, may be operatively connected between at least one of the first and second wrist elements and the pivot angle redirect angle arrangement, for driving the pivot angle redirect in such a manner that the pivot angel redirect arrangement is rotated to one half of the pivot angle when angularly redirecting the fiber tows about the pivot axis through the pivot angle. In some forms of the invention, the pivot torque motor has an additional output thereof which is operatively attached to the pivot angle redirect to function as the pivot angle redirect drive, to drive the pivot angle at one half the angular speed of the first and second members of the pivot torque motor are moving with respect to one another.

A redirect drive arrangement, according to the invention, may include a fiber tow guide having a plurality of substantially axially oriented passages extending therethrough, for guiding a plurality of tows through the opening in the head rotation torque motor. The fiber tow guide may be rotatably mounted within the head rotation torque motor, in a manner allowing the fiber tow guide to rotate freely with respect to the head rotation torque motor about the rotational axis of the head rotation torque motor. The fiber tow guide may include a substantially circular cylindrical member, and one or more guide bars. The cylindrical member is operatively rotatably mounted within the head rotation torque motor in a manner allowing the cylindrical member to rotate freely with respect to the head rotation torque motor, about the rotational axis of the head rotation torque motor. The guide bar is fixedly attached to the cylindrical member of the fiber tow guide, with the guide bar including a plurality of substantially axially oriented passages extending therethrough, for guiding the plurality of tows through the opening and the head rotation torque motor and the opening in the base of the second wrist element.

A redirect arrangement, according to the invention, may further include an additional fiber tow guide having a plurality of substantially axially oriented passages extending therethrough for guiding a plurality of tows through the opening in the wrists rotation torque motor. The additional fiber tow guide may be operatively rotatably connected to the second member of the wrist rotation torque motor in a manner allowing the additional fiber tow guide to rotate freely with respect to the wrist rotation torque motor, about the rotational axis of the wrist rotation torque motor.

A compact fiber placement apparatus, according to the invention, may further include a wrist mounting adaptor, having a first mounting surface thereof adapted for fixed attachment to the fiber placement machine, and a second mounting surface thereof adapted for fixed attachment to the second member of the wrist rotation torque motor. In forms of the invention including a redirect arrangement, the additional fiber tow guide may be operatively rotatably connected to the wrist mounting adaptor, in a manner allowing the additional fiber tow guide to rotate freely with respect to the wrist rotation torque motor, and the wrist mounting adaptor, about the rotational axis of the wrist rotation torque motor.

The invention may also be practiced in the form of a method for providing or operating a compact fiber placement apparatus, according to the invention.

Other aspects, objects and advantages of the invention will be apparent from the following description of exemplary embodiments taken in conjunction with the accompanying figures.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
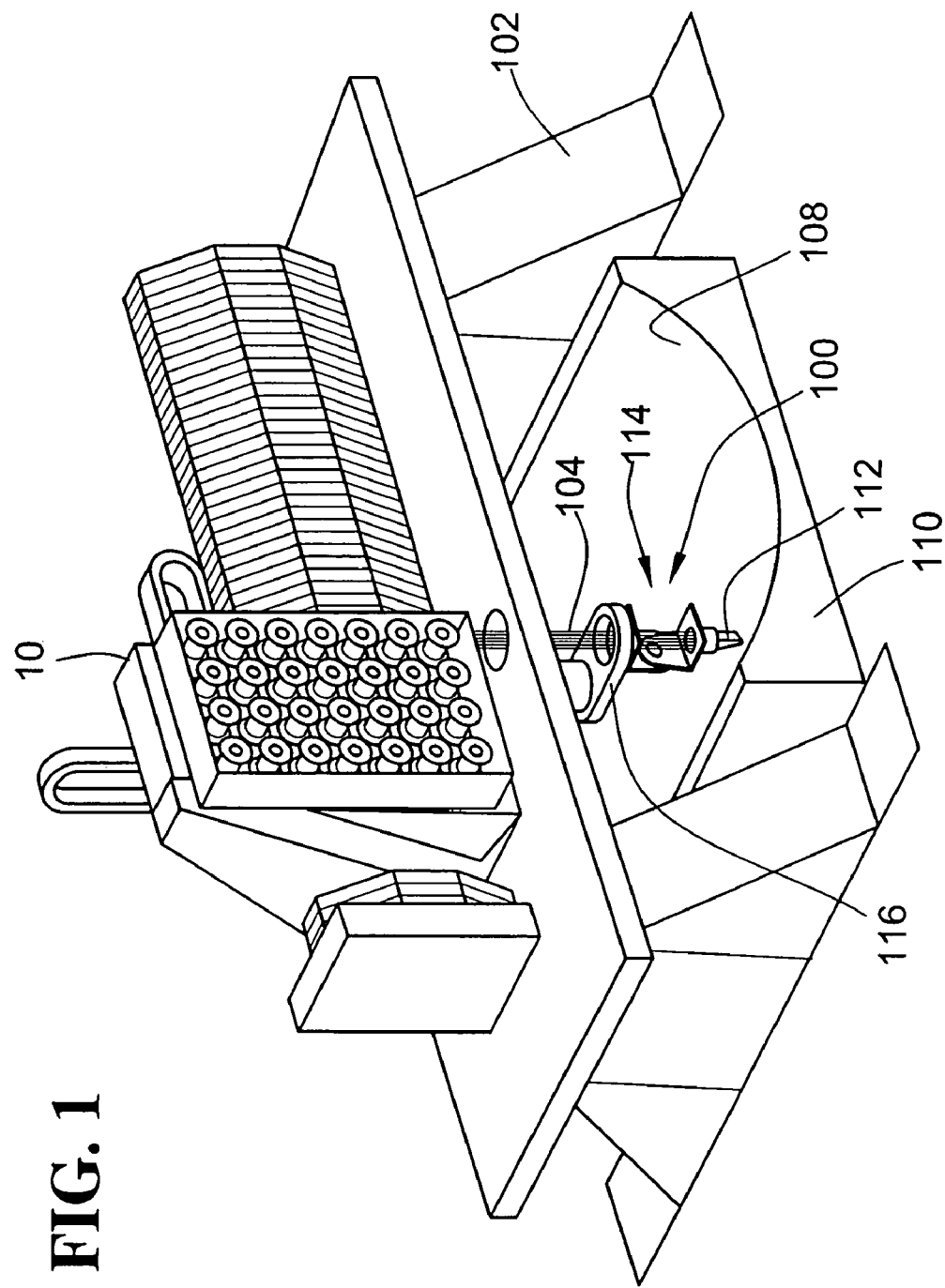
FIG. 1 is a perspective illustration of a first exemplary embodiment of a compact fiber placement apparatus, according to the invention, mounted on a gantry-style fiber placement machine, for placing fiber tows onto a tool surface of a tool.
Figure 2:
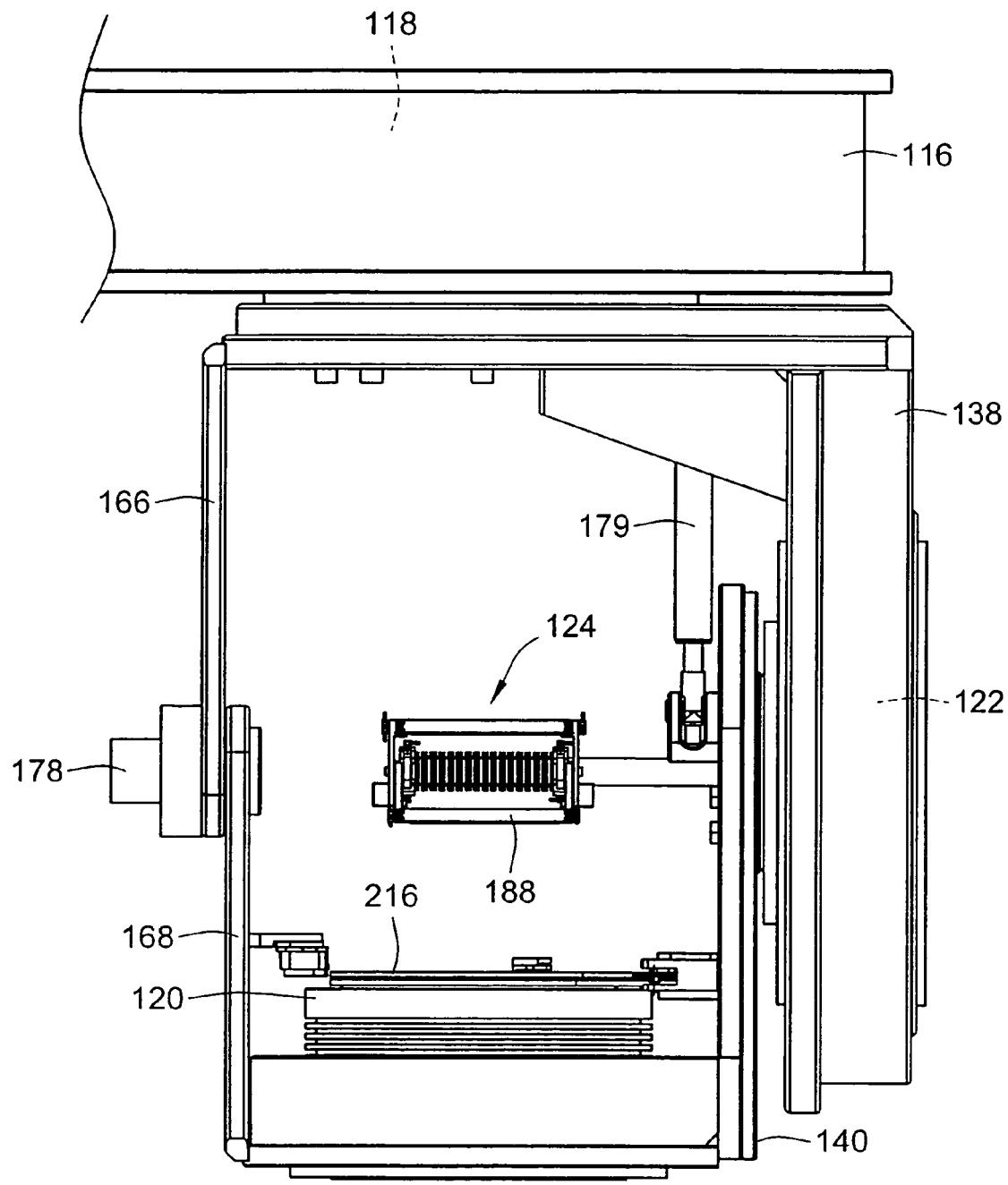
FIG. 2 is a partial side view of the exemplary embodiment of the compact fiber placement apparatus shown in FIG. 1.

FIG. 1 illustrates a first exemplary embodiment of a compact fiber placement apparatus 100, according to the invention, operatively attached to a gantry-style fiber placement machine 102, for placing fiber tows 104, supplied from a creel 106 onto a tool surface 108 of a tool 110.

As shown in FIGS. 1-4, and 7-11, the exemplary embodiment of the compact fiber placement apparatus, according to the invention, includes a fiber placement head 112, an articulate wrist apparatus 114, a wrist mounting adaptor 116, a wrist rotation torque motor 118, a head rotation torque motor 120, a wrist pivot torque motor 122, and a redirect arrangement 124. The fiber placement head 112 is not illustrated in FIGS. 2-4, so that the remaining components of the exemplary embodiment of the compact fiber placement apparatus 100 can be illustrated in a larger size for clarity of understanding.

Figure 3:
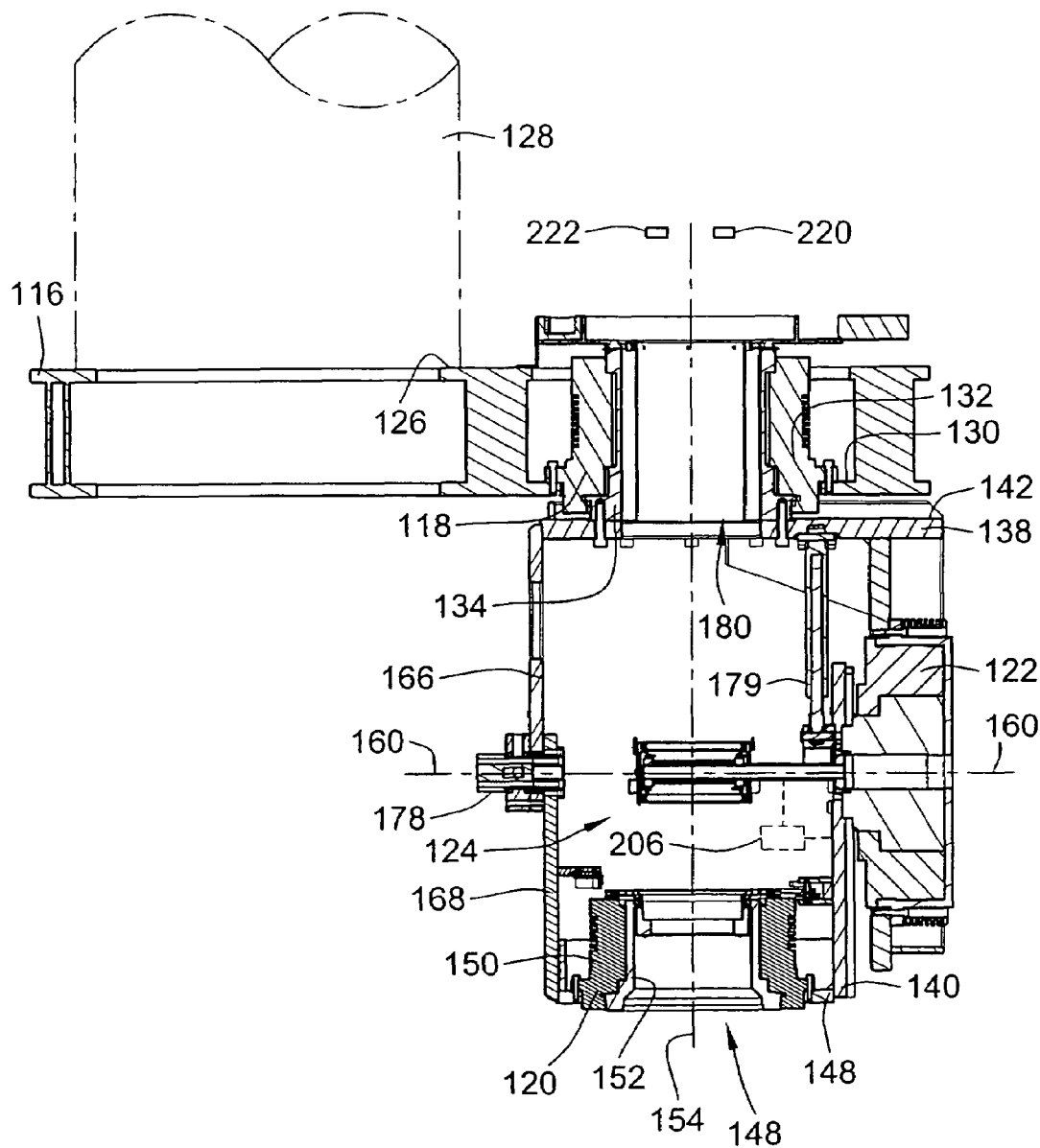
FIG. 3 is a cross-section of the side view of the exemplary embodiment of the fiber placement apparatus shown in FIGS. 1 and 2.

As illustrated schematically in FIG. 3, the wrist mounting adaptor 116 has a first mounting surface 126, thereof, adapted for fixed attachment to a vertically movable ram of the fiber placement machine 102. The wrist mounting adaptor 116 further includes a second mounting surface 130 thereof, adapted for fixed attachment thereto of a second, non-rotatable member 132 of the wrist rotation torque motor 118. The wrist rotation torque motor 118 also includes a first member 134 thereof, which is disposed within the second member 132 of the wrist rotation torque motor 118, and is rotatable about a wrist rotation axis 136.

Figure 4:
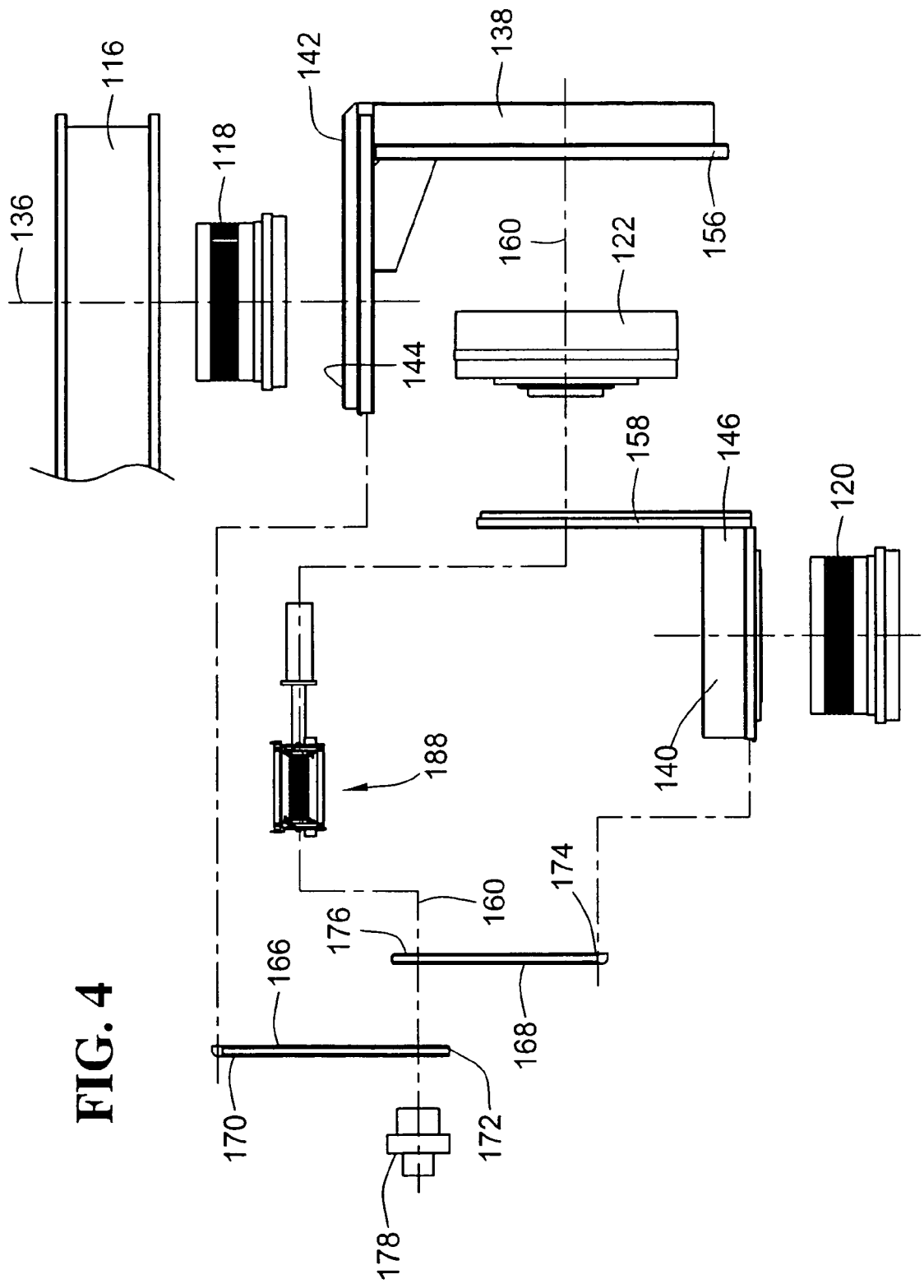
FIG. 4 is an exploded side view of the exemplary embodiment of the compact fiber placement apparatus shown in FIGS. 1-3.

As best seen in FIG. 4, the articulated wrist apparatus 114 includes a first and a second wrist element 138, 140 thereof, operatively connected to one another, and adapted for operatively connecting the fiber placement head 112 to the wrist mounting adaptor 116, with the wrist mounting adaptor 116 being connected to the fiber placement machine 102, in the manner described above and illustrated in FIG. 1 and FIG. 3.

The first wrist element has a base 142 thereof, having a mounting surface 144 adapted for fixed attachment to the rotatable first member 134 of the wrist rotation torque motor 118, in the manner illustrated in FIG. 3. The first wrist element also defines the wrist rotation axis 136, with the mounting surface 144 of the base 142 of the first wrist element 138 extending substantially perpendicularly to the wrist rotation axis 136.

As shown in FIGS. 3 and 4, the second wrist element 140 has a base 146 thereof which defines a mounting surface 148 of the second wrist element 140, with the base 148 being adapted for mating with a corresponding mating surface of a first, non-rotatable, member 150, of the head rotation torque motor 120. The head rotation torque motor 120 also includes a second, rotatable, member 152 thereof, which is disposed within the first member 150 of the head rotation torque motor 120, for rotatable movement of the second member 152 about a head rotation axis 154. The fiber placement head 112 is fixedly attached to the second member 152 of the head rotation torque motor 118, for rotatable movement of the fiber placement head 112 about the head rotation axis 154. The head rotation axis 154 is defined by the second wrist element and extends substantially perpendicularly to the mounting surface 144 of the base 146 of the second wrist element 140.

As best seen in FIG. 4, the first and second wrist elements 138, 140 are each generally L-shaped, single-tined, forks, with the first wrist element 138 having a support arm 156 extending substantially perpendicularly from the base 142 of the first wrist element 138, and, in similar fashion, the second wrist element 140 having a support arm 158 extending substantially perpendicularly from the base 146 of the second wrist element 140.

The support legs 156, 158 are pivotably joined, by the wrist pivot torque motor 122, for pivotable movement of the first and second wrist elements 138, 140, with respect to one another, about a common pivot axis 160, as illustrated in FIGS. 3 and 4. Specifically, as best seen in FIG. 3, the wrist pivot torque motor 122 includes first and second members 162, 164 thereof, which are rotatable relative to one another, about a rotational axis of the wrist pivot torque motor 122, which is aligned coincident with the common pivot axis 160. The first member 162 of the wrist pivot torque motor 122 is fixedly attached to the support arm 156 of the first wrist element 138, and the second member 164 of the wrist pivot torque motor 122 is fixedly attached to the support arm 158 of the second wrist element 140.

Figure 7:
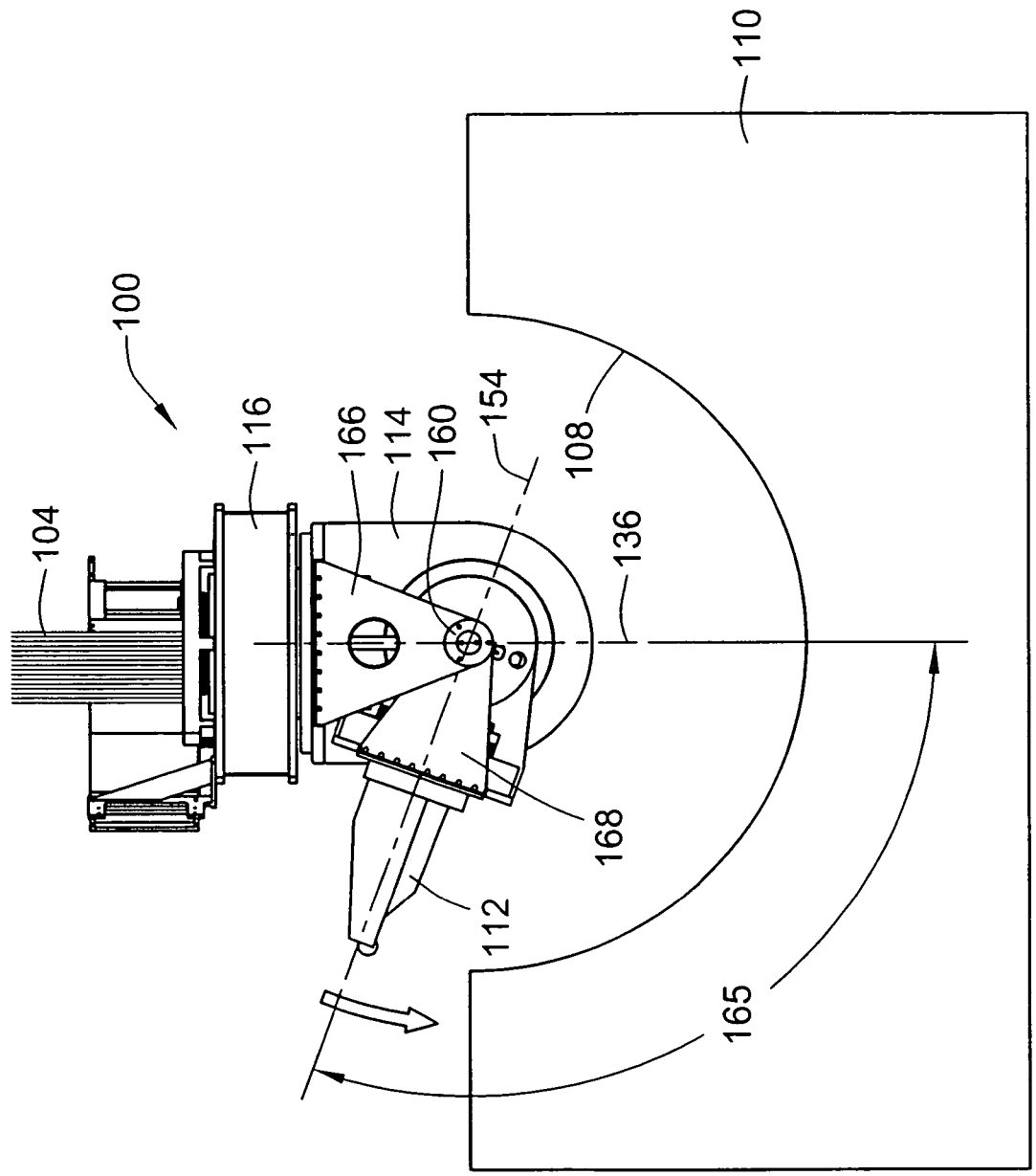
FIGS. 7-11 are end views of the exemplary embodiment of the compact fiber placement apparatus, according to the invention, sequentially illustrating operational aspects of the exemplary embodiment of the compact fiber placement apparatus, according to the invention.

The first and second wrist elements 138, 140, are further configured, such that when they are pivotably attached to one another for pivotable motion about the common pivot axis 160, and the respective mounting surfaces 142, 148 extending parallel to one another, the wrist rotation axis 136, of the first wrist element 138, is aligned substantially coincident with the head rotation axis 154 of the second wrist element 140. As illustrated in FIG. 7, by virtue of this arrangement, as the first and second wrist elements 138, 140 are pivoted about the common pivot axis 160, the wrist rotation axis 136 and the head rotation axis 154 continue to intersect one another and the pivot axis 160, to define a pivot angle 166 between the first and second wrist elements 138, 140.

As shown in FIGS. 3, 4, and 7, the exemplary embodiment of the compact fiber placement apparatus 100 also includes a first and a second removable support arm 166, 168, each having a respective attachment end and a distal end thereof. The distal ends 172, 176 of the removable support arms 166, 168 are operatively attached to one another through a bearing arrangement 178 for independent pivotable movement with respect to one another, about the common pivot axis 160. The attachment end 170 of the first removable support arm 166 is adapted for removable bolted attachment to the base 142 of the first wrist element 138, opposite and spaced from the support arm 156 of the first wrist element 138, along the pivot axis 160. In similar fashion, the attachment end 174 of the second removable support arm 168 is adapted for removable bolted attachment to the base 146 of the second wrist element 140, opposite and spaced along the pivot axis 160 from the support arm 158 of the second wrist element 140.

It will be understood, that not all embodiments of a compact fiber placement apparatus, according to the invention, will include the removable support arms 166, 168 and the associated bearing arrangement 178. Stated another way, in some embodiments of the invention, the L-shaped first and second wrist elements 138, 140 may be made sufficiently robust, that an additional support mechanism joining the first and second wrist elements 138, 140 may not be required. Where such additional support is required, however, it is highly desirable to have the support arms 166, 168 be removable, to facilitate access to the area inside of the articulated wrist apparatus 114, for threading multiple fiber tows 104 through the interior of the compact fiber placement apparatus 100.

As shown in FIG. 3, the bases 142, 146, of the first end second wrist elements 138, 140, respectively, each include an opening 180, 182 therein, respectively disposed about the wrist rotation axis 136 and the head rotation axis 154. The first member 134 of the wrist rotation torque motor 118, which is fixedly attached to the base 142 of the first wrist member 138, for rotation about the wrist rotation axis 136, in the manner described above, includes a passage 184 extending through the first member 134 of the wrist rotation torque motor 118, along the wrist rotation axis 136, for passage therethrough of the multiple fiber tows 104 as the fiber tows 104 travel from the creel 106 to the fiber placement head 112, for application onto the tool surface 108.

In similar fashion, the second member 152 of the head rotation torque motor 120, includes a passage 186 extending through the second member 152 of the head rotation torque motor 120, to allow passage of the multiple fiber tows 104 through the head rotation torque motor 120 to the fiber placement head 112.

Figure 5:
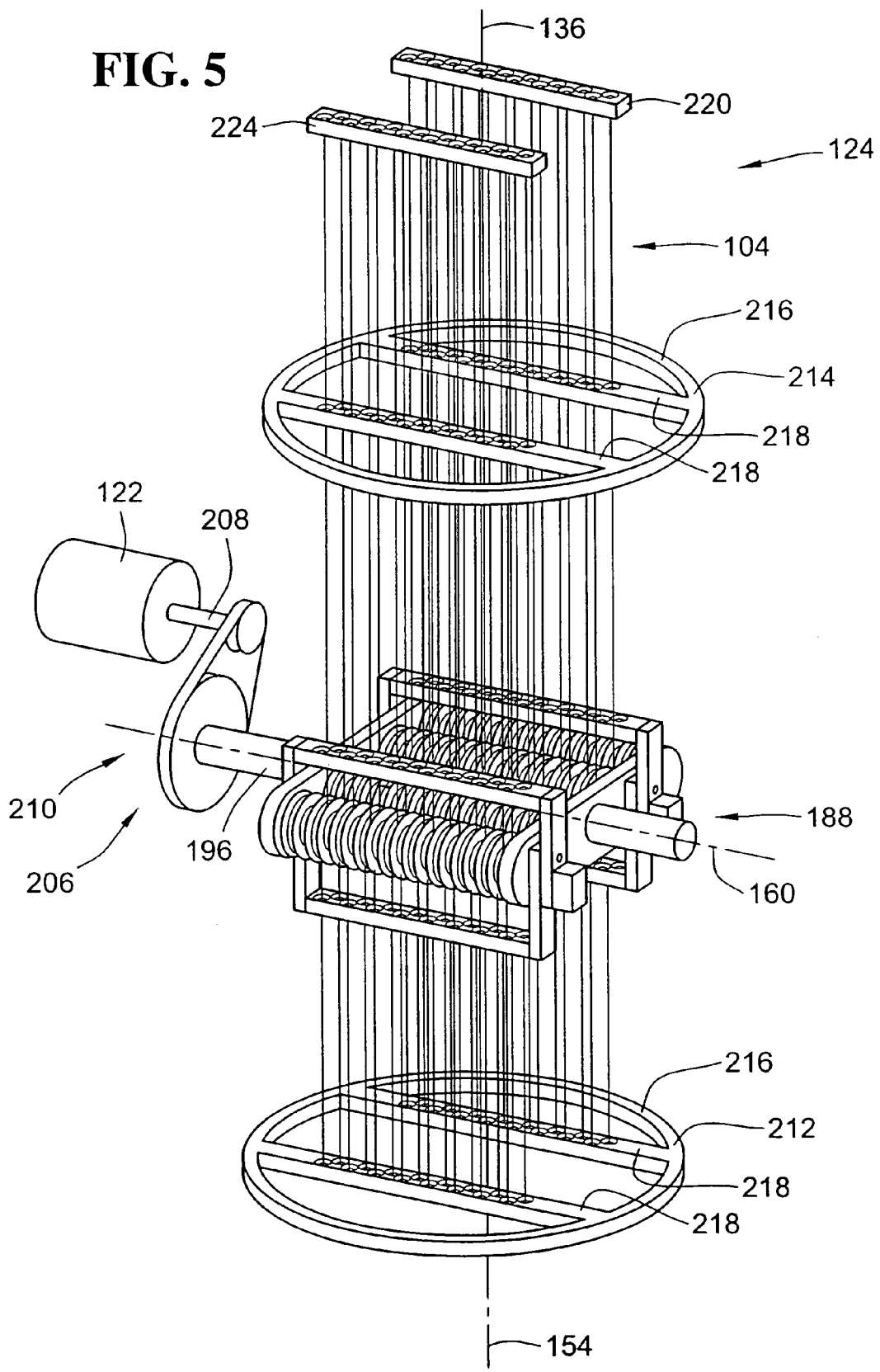
FIG. 5 is a perspective illustration of a redirect arrangement, of the exemplary embodiment of the compact fiber placement apparatus shown in FIGS. 1-4.

As shown in FIG. 5, the exemplary embodiment of the compact fiber placement apparatus includes a redirect arrangement, of elegant simplicity, having components thereof which are configured and operatively mounted in a manner which allows the exemplary embodiment of the compact fiber placement apparatus to operate through vivid angles greater than 90°, such as plus and minus 110°, and through rotational angles greater than 180°, such as plus and minus 185°, while properly redirecting 32 separate fiber tows 104, in the configuration illustrated in FIG. 5.

The redirect arrangement 124, includes a wrist pivot angle redirect arrangement 188 having four rows of guide wheels rotatably attached to four guide wheel shafts (not shown) which extend substantially parallel to the common pivot axis 160 in a mounting plane including the common pivot axis 160. The ends of the mounting shafts of the guide wheels 190 are attached to a pair of guide wheels support bars 192, 194 attached to a pivot angle redirect drive shaft 196 which extends outward from the wrist pivot torque motor 122 along the common pivot axis 160. The rows of guide wheels 190 are arranged such that two rows of the guide wheels 190 are positioned side-by-side, on each side of the pivot axis 160, with the number of wheels, and their configuration being selected in consideration of the number of fiber tows 104 needing redirection, with half of the fiber tows 104 passing between the rows of wheels 190 on one side of the pivot axis 160 and half of the fiber tows 104 passing between the rows of wheels 190 on the opposite side of the pivot axis 160.

Figure 6:
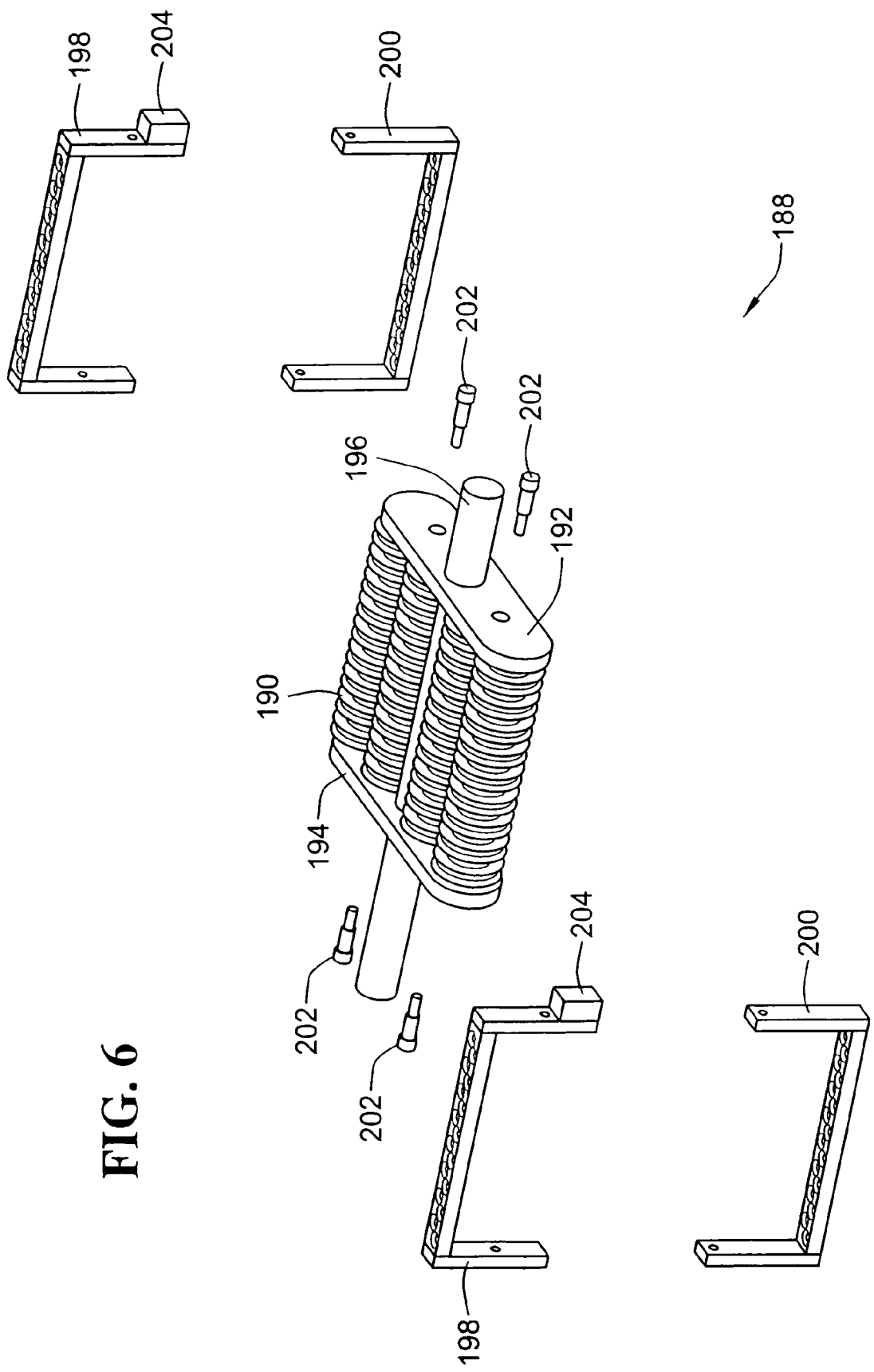
FIG. 6 is an exploded perspective illustration of a portion of the redirect arrangement shown in FIG. 5.

As shown in FIGS. 5 and 6, the pivot angle redirect arrangement also includes two sets of upper and lower pivot redirect guide bars 198, 200, which are pivotably attached by shoulder bolts 202 to the pivot angle redirect guide wheel support bars 192 and 194. The upper and lower pivot redirect guide bars 198, 200 include a plurality of guide holes therein, through which the half of the fiber tows 104 disposed on either side of the pivot axis 160 are threaded. The redirect guide bars 198, 200 are positioned above and below the guide wheels 190, for directing the fiber tows 104 into the spaces between the rows of guide wheels on opposite sides of the pivot axis 160. The upper pivot redirect guide bars 198 include a counterweight 204 to orient the upper pivot redirect guide bars 198 in a manner facilitating threading the fiber tows 104 through the upper pivot redirect guide bars 198.

As illustrated schematically in FIGS. 3 and 5, the pivot angle redirect drive shaft is driven by a pivot angle redirect drive apparatus 206, operatively connected between at least one of the first and second wrist elements 138, 140 and the pivot angle redirect arrangement 188, in such a manner that the pivot angle redirect arrangement 188 rotates about the pivot axis 160 at one-half the angular rate at which the first and second wrist elements 138, 140 are moving with respect to one another. By virtue of this arrangement, the guide wheel support bars 192, 194 of the pivot angle redirect arrangement 188 will always be maintained at a rotational position about the pivot axis 160 which is one-half of the current pivot angle 165. As a result of this half-speed driving arrangement, and the construction of the pivot angle redirect arrangement 188, the fiber placement head 112 may be pivoted through very large pivot angles 165, with the individual fiber tows 104 being appropriately redirected about the pivot axis 160 without having the individual fiber tows 104 come in contact with one another.

As illustrated schematically in FIG. 5, in the exemplary embodiment of the compact fiber placement apparatus 100, the wrist pivot torque motor 122 has an additional output 208 thereof, which is connected via a chain and sprocket drive arrangement 210 to the pivot angle redirect drive shaft 196, in such a manner that the pivot angle redirect drive shaft is driven about the pivot axis 160 at half the angular rotation of the second wrist element 140 of the articulated wrist apparatus 114. In other embodiments of the invention, however, other drive arrangements and sources may be utilized for appropriately positioning the pivot angle redirect arrangement 188, in accordance with the invention. In other embodiments of the invention, the pivot angle redirect arrangement may also take forms other than the one illustrated herein with respect to the exemplary embodiment 100 of the invention.

As shown in FIG. 5, the redirect arrangement 124, of the exemplary embodiment of the compact fiber placement apparatus 100, includes two additional first and second rotatable tow guides 212, 214 of substantially identical construction, including a cylindrical member 216 having pairs of guide bars 218 spaced apart from one another and extending in a chordal fashion across the opening inside of the cylindrical part 216 of the rotatable tow guides 212, 214.

The first rotatable tow guide 212 is operatively rotatably mounted within the head rotation torque motor 120, in a manner allowing the first rotatable tow guide to rotate freely about the head rotation axis 154. The second rotatable tow guide 214 is operatively rotatably mounted within the wrist rotation torque motor 118, in a manner allowing the second rotatable tow guide to rotate freely about the wrist rotation axis 136.

As shown in FIGS. 3 and 5, the redirect arrangement 124, of the exemplary embodiment of the compact fiber placement apparatus includes an additional set of non-rotating fiber tow guide bars 220, 224, having a plurality of holes extending therethrough for passage of the fiber tows 104 which are positioned above the wrist mounting adaptor 116, as illustrated in FIG. 3, by a support structure (not shown) attached to the wrist mounting adaptor 116. In the exemplary embodiment of the compact fiber placement apparatus 100, the fiber placement head 112 also includes a set of guide bars (not shown) fixedly attached to a frame of the fiber placement head, and corresponding to the non-rotatable fiber tow guide bars 220, 222.

It will be appreciated, by those having skill in the art, that by virtue of the widely spaced locations of the various components of the redirect arrangement 124 along the path taken by the fiber tows in traveling through the compact fiber placement apparatus to the fiber placement head 112, together with their simple and compact construction, results in a long distance within which to accomplish the necessary redirection of the plurality of tows 104, despite the small size of the compact fiber placement apparatus 100, to thereby allow the exemplary embodiment of the compact fiber placement apparatus 100 to be operable through a wide range of pivot and rotational angles.

FIGS. 7-11 sequentially illustrate the manner in which the exemplary embodiment of the compact fiber placement apparatus 100 may be utilized for rapidly, effectively, and efficiently laying fiber plys on a tool surface 108 having a rather deeply concave contour, which would be difficult to lay fiber tows 104 onto with prior fiber placement apparatuses and methods. By virtue of its compact construction, a compact fiber placement apparatus, according to the invention, can be lowered into, and operate within a considerably smaller concave cavity then prior fiber placement apparatuses and methods.

In FIG. 7, the fiber placement head 112 is beginning a downward counterclockwise rotation, about the pivot axis 160, to apply a band of the fiber tows 104 to a semi-circular, or hemispherical shaped tool surface 108, having a radius substantially equaling the distance from the pivot axis 160 to a nip point of a compaction roller on the fiber placement head 112.

Figure 8:
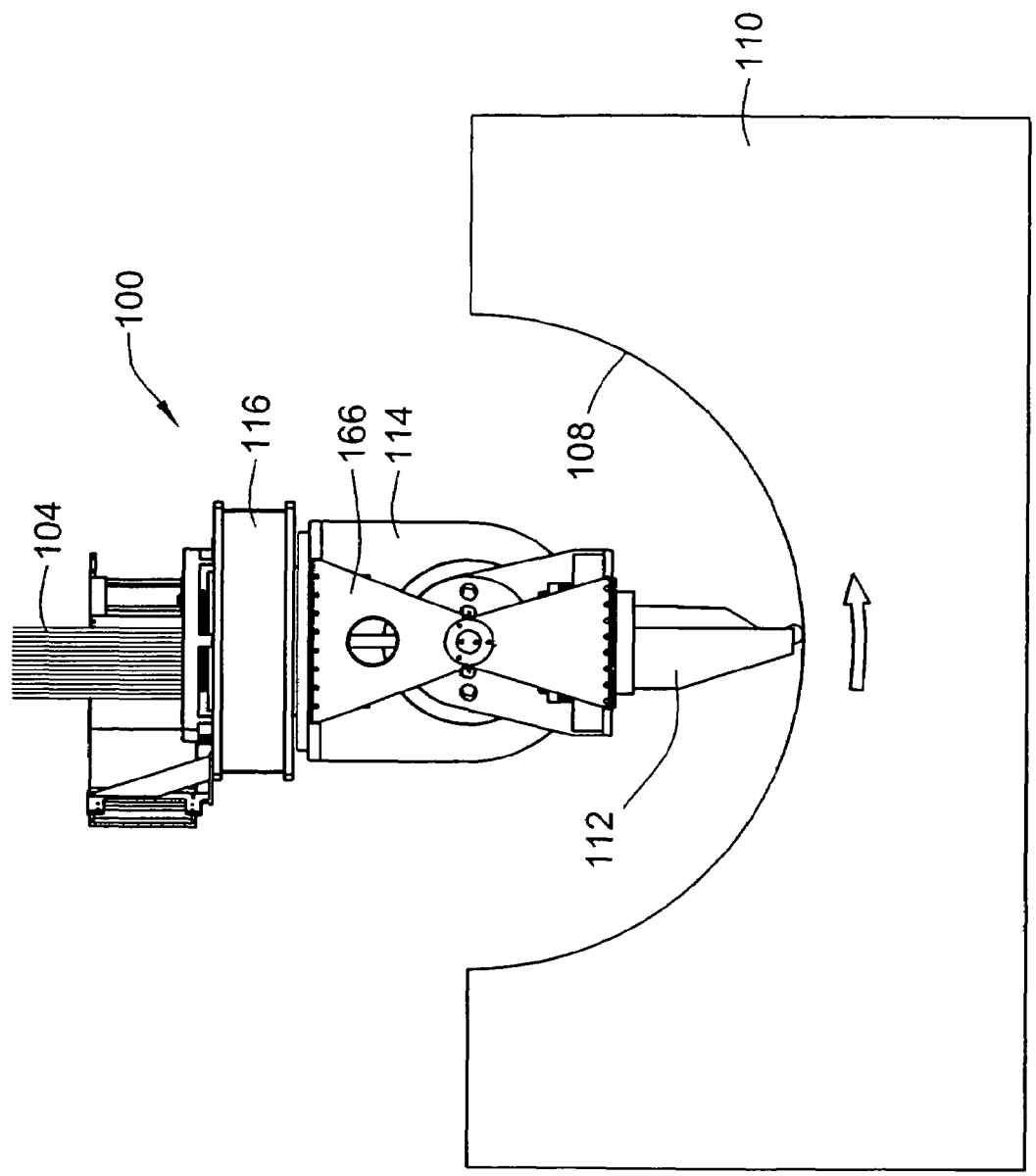

FIG. 8 shows the fiber placement head 112 at a midpoint, corresponding to a pivot angle of zero, along the tool surface 108.

Figure 9:
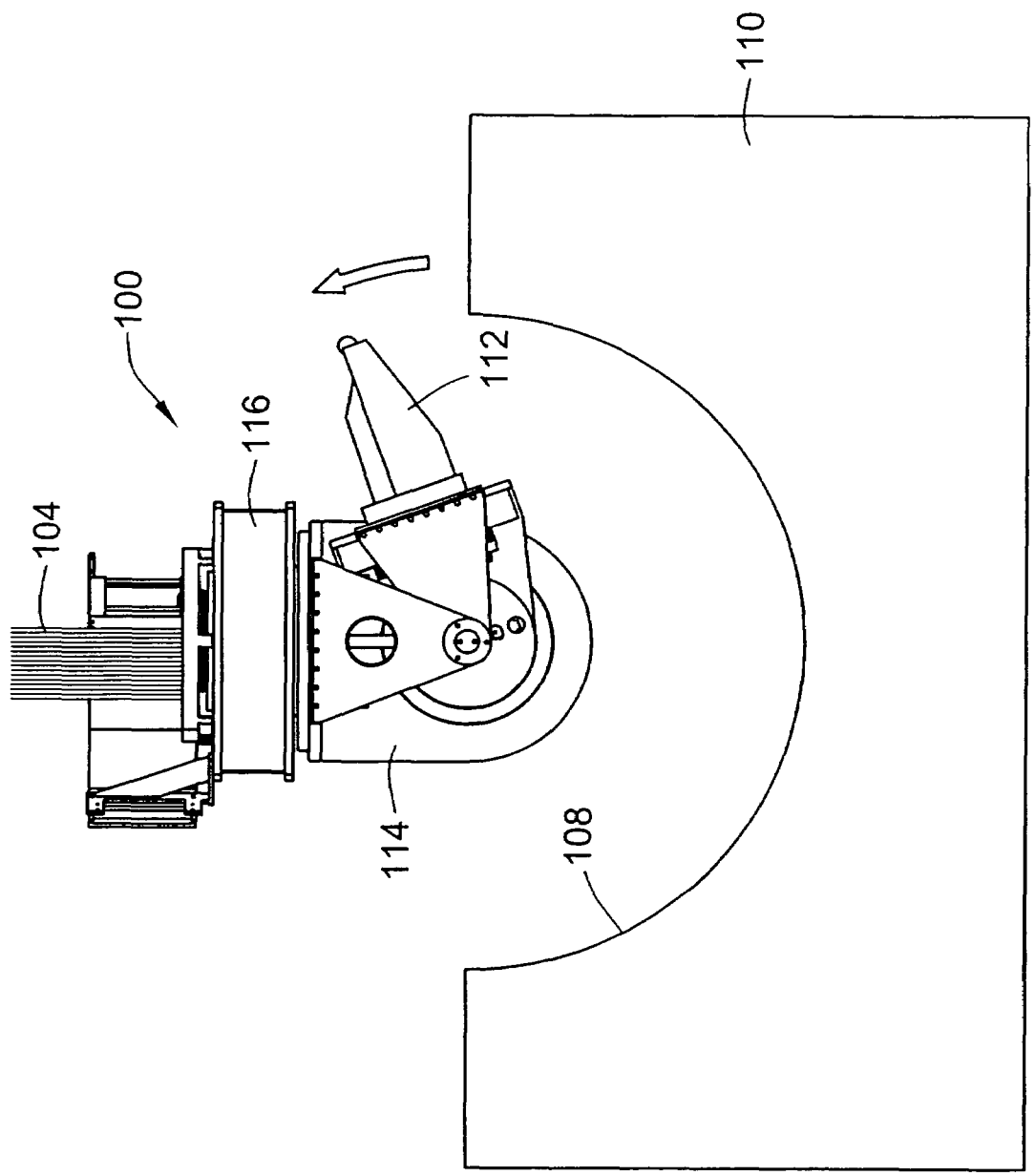

In FIG. 9, the fiber placement head 112 has completed a first course of application of the fiber tows 104 to the tool surface 108 and has cut the fiber tows 104 at the end of the tool surface 108.

Figure 10:
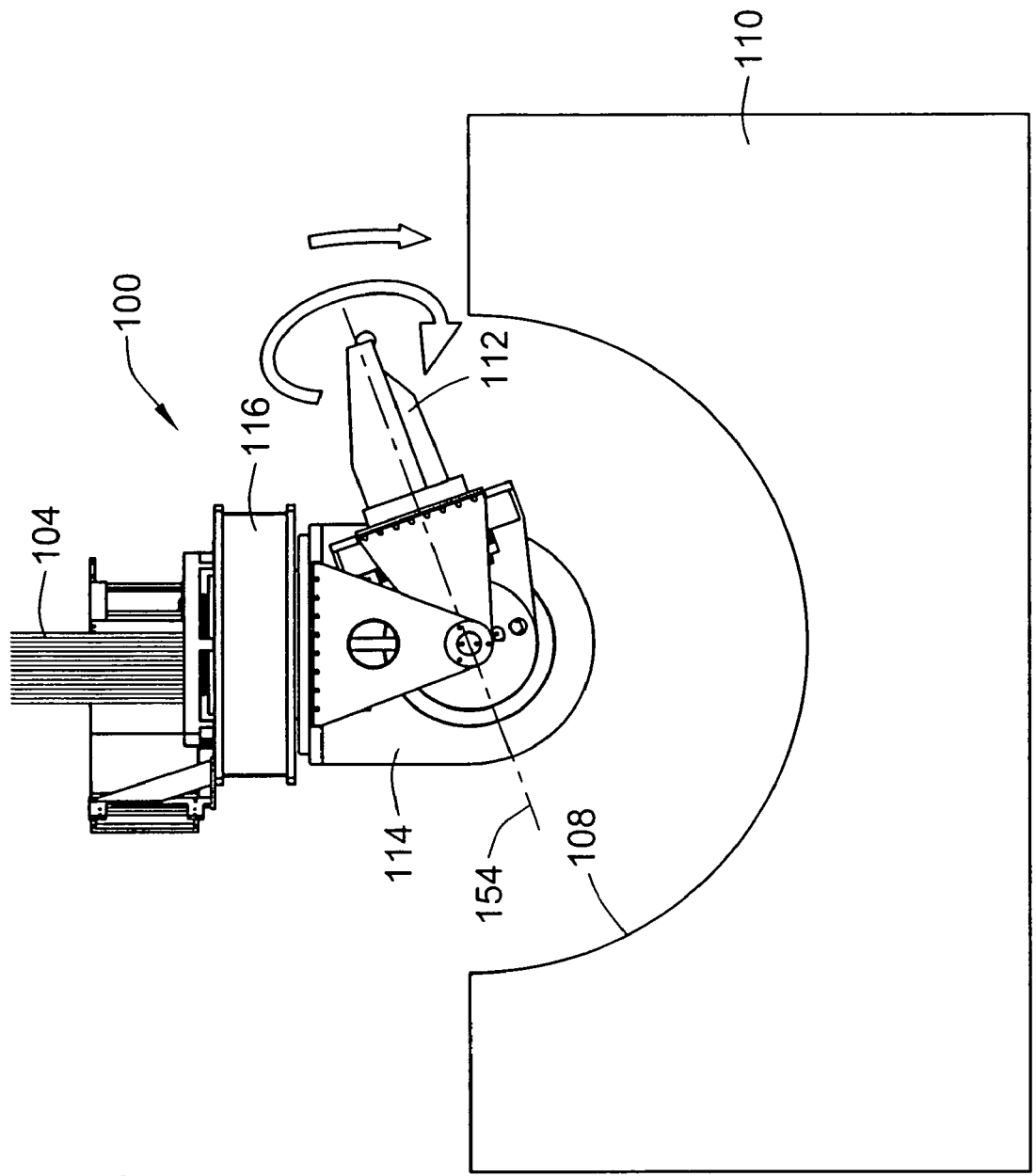
Figure 11:
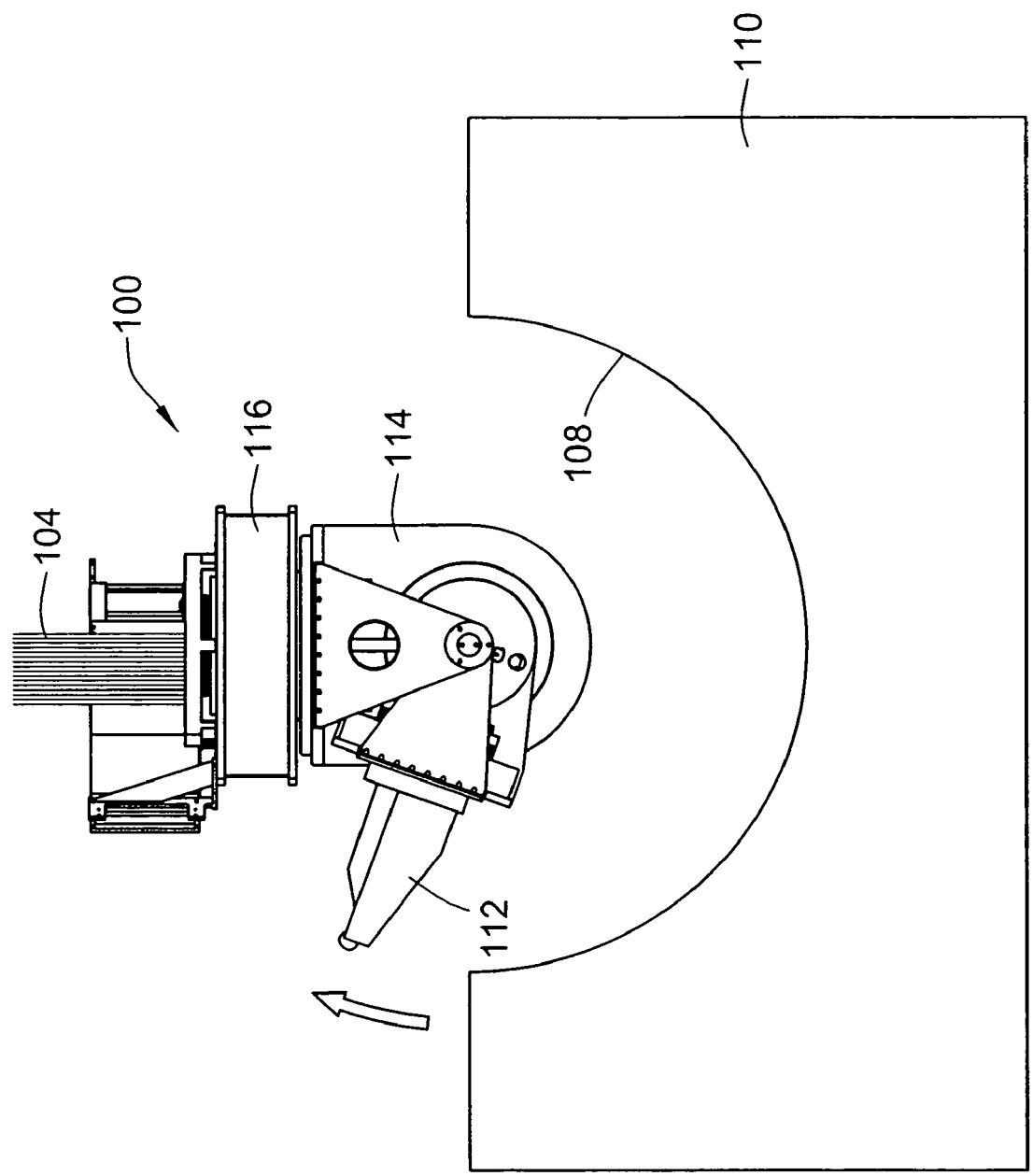

In FIG. 10, the fiber placement head 112 has flipped 1800 about the head rotation axis 154 and is preparing to descend in a clockwise direction, into the tool 110 along the concave surface 108, for applying another band of the tows 104 to the tool surface 108 in an opposite direction to the band laid down while the fiber placement head 112 was being pivoted in the counterclockwise direction, as shown in FIGS. 7-9.

The ability to rapidly rotationally flip the fiber placement head 112, so that bi-directional fiber placement can be carried out during the fiber placement process significantly enhances the speed, efficiency, and effectiveness with which the fiber placement process can be carried out. The torque motors 118, 120, 122, of the exemplary embodiment of the compact fiber placement apparatus 100 are capable of flipping or otherwise rotating the fiber placement head 112 significantly more quickly than other types of motors or drive arrangements used in prior fiber placement apparatuses. It will be understood, however, that in some embodiments of the invention, motors or drive apparatuses other than the torque motors 118, 120, 122 may be utilized within the scope of the invention.

Although the first and second writ elements 138, 140, of the exemplary embodiment of the compact fiber placement apparatus 100, are each configures as half-mounting forks, in order to provide optimized access between the mounting bases 142, 148 for routing of the fiber tows 104 through the redirect arrangement 124, in other embodiments of the invention, those having skill in the art will recognize that the first and second wrist elements 138, 140 may take many other forms, including a traditional fork structure having two extending fork arms, or any other appropriate configuration allowing for the pivoting connection between the first and second wrist elements 138, 140.

It will be further recognized, by those having skill in the art, that although the exemplary embodiment utilizes three torque motors, in other embodiments of the invention, one or more of these torque motors may be replaced by other types of drive mechanisms.

Those having skill in the art will also readily recognize that an articulated support structure, according to the invention, allows the redirects to be substantially simpler than the redirects required in prior support structures for fiber placement heads.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A compact fiber placement apparatus, comprising:

a head rotation torque motor, having a rotatable member thereof defining a rotational axis of the rotatable member and an opening passing axially through the head rotation torque motor disposed about the rotational axis of the rotatable member; and a fiber placement head including a fiber placement head frame having a mounting plate thereof which is adapted for fixed attachment to the rotatable member of the head rotation torque motor;

the mounting plate of the fiber placement head frame having a hole extending therethrough which is substantially aligned with the opening in rotatable member of the head rotation torque motor, when the fiber placement head frame is attached to the rotatable member of the head rotation torque motor;

a fiber tow guide having a plurality of substantially axially oriented passages extending therethrough for guiding a plurality of tows through the opening in the rotatable member and the hole in the mounting plate of the fiber placement head frame;

the fiber tow guide being rotatably mounted within the rotatable member of the fiber head torque motor in a manner allowing the fiber tow guide to rotate freely with respect to the rotatable member of the fiber head torque motor, about the rotational axis of the rotatable member of the fiber head torque motor.

2. The compact fiber apparatus of claim 1, wherein, the fiber tow guide comprises:

a substantially circular cylindrical member, operatively rotatably mounted within the rotatable member of the fiber head torque motor in a manner allowing the cylindrical member to rotate freely with respect to the rotatable member of the fiber head torque motor, about the rotational axis of the rotatable member of the fiber head torque motor; and a guide bar fixedly attached to the cylindrical member of the fiber tow guide, with the guide bar including the plurality of substantially axially oriented passages extending therethrough for guiding the plurality of tows through the opening in the rotatable member and the hole in the mounting plate of the fiber placement head frame.

3. A compact fiber placement apparatus, comprising:

a head rotation torque motor, having a rotatable member thereof defining a rotational axis of the rotatable member and an opening passing axially through the head rotation torque motor disposed about the rotational axis of the rotatable member; and a fiber placement head including a fiber placement head frame having a mounting plate thereof which is adapted for fixed attachment to the rotatable member of the head rotation torque motor;

the mounting plate of the fiber placement head frame having a hole extending therethrough which is substantially aligned with the opening in the rotatable member of the head rotation torque motor, when the fiber placement head frame is attached to the rotatable member of the head rotation torque motor;

an articulated wrist apparatus having a first and second wrist elements thereof operatively connected to one another and adapted for operatively connecting a fiber placement head to a fiber placement machine;

the first wrist element having a base thereof adapted for rotatable attachment to the fiber placement machine, with the base of the first wrist defining a mounting surface of the first wrist element adapted for mating with a corresponding mating surface of the fiber placement machine, and also defining a rotational axis of the first wrist extending substantially perpendicularly to the mounting surface of the base of the first wrist element;

the second wrist element having a base thereof adapted for operative rotatable attachment thereto of the fiber placement head, with the base of the second wrist defining a mounting surface of the second wrist element adapted for mating with a corresponding mating surface of the fiber placement head, and also defining a rotational axis of the second wrist extending substantially perpendicularly to the mounting surface of the base of the second wrist element;

the first and second wrist elements being pivotably attached to one another along a common pivot axis of the wrist elements extending orthogonally to the rotational axes of the first and second wrist elements in such a manner that, when the wrist elements are positioned with their respective mounting surfaces extending parallel to one another the rotational axis of the first wrist element is substantially concentric with the rotational axis of the second wrist element;

such that, as the first and second wrist elements are pivoted to a wrist pivot angle with respect to one another about the common pivot axis, the rotational axes of the first and second wrist elements continue to intersect one another and the pivot axis, with the relative angle between the rotational axes of the first and second wrist elements matching the pivot angle.

4. A compact fiber placement apparatus, comprising:

an articulated wrist mounting apparatus having a first and a second wrist element thereof operatively connected to one another and adapted for operatively connecting a fiber placement head to a fiber placement machine;

the first wrist element having a base thereof adapted for rotatable attachment to the fiber placement machine, with the base of the first wrist element defining a mounting surface of the first wrist element adapted for mating with a corresponding mating surface of the fiber placement machine, and also defining a rotational axis of the first wrist element extending substantially perpendicularly to the mounting surface of the base of the first wrist element;

the second wrist element having a base thereof adapted for operative rotatable attachment thereto of the fiber placement head, with the base of the second wrist element defining a mounting surface of the second wrist element adapted for mating with a corresponding mating surface of the fiber placement head, and also defining a rotational axis of the second wrist element extending substantially perpendicularly to the mounting surface of the base of the second wrist element;

the first and second wrist elements being pivotably attached to one another along a common pivot axis of the wrist elements extending orthogonally to the rotational axes of the first and second wrist elements in such a manner that, when the wrist elements are positioned with their respective mounting surfaces extending parallel to one another the rotational axis of the first wrist element is substantially coincident with the rotational axis of the second wrist element;

such that, as the first and second wrist elements are pivoted to a wrist pivot angle with respect to one another about the common pivot axis, the rotational axes of the first and second wrist elements continue to intersect one another and the pivot axis, with the relative angle between the rotational axes of the first and second wrist elements matching the pivot angle.

5. The apparatus of claim 4, wherein, the base of each the first and second wrist elements includes an opening passing therethrough about the rotational axes, and adapted for passage therethrough of a plurality of fiber tows.

6. The compact fiber placement apparatus of claim 4, further comprising:

a head rotation torque motor having first and second members thereof operatively connected for rotation relative to one another about a head rotation torque motor axis extending substantially coincident with the rotational axis of the second wrist element;

the first member of the head rotation torque motor being fixedly attached to the base of the second wrist element, and the second member of the head rotation torque motor being adapted for fixed attachment thereto of the fiber placement head.

7. The compact fiber placement apparatus of claim 6, further comprising:

a wrist rotation torque motor having first and second members thereof operatively connected for rotation relative to one another about a wrist rotation torque motor axis extending substantially coincident with the rotational axis of the first wrist element;

the first member of the wrist rotation torque motor being fixedly attached to the base of the first wrist element, and the second member of the wrist rotation torque motor being adapted for fixed attachment to the fiber placement machine.

8. The compact fiber placement apparatus of claim 7, wherein:

the base of each the first and second wrist elements includes an opening passing therethrough about the rotational axes, and adapted for passage therethrough of a plurality of fiber tows; and each of the head and wrist rotation torque motors includes an opening passing therethrough about the rotational axes, and adapted for passage therethrough of the plurality of fiber tows passing through the openings in the bases of the first and second wrist elements.

9. The apparatus of claim 4, further comprising, a pivot drive element operatively connected between the first and second wrist elements, for applying a pivoting torque to the first and second wrist elements about the common pivot axis of the wrist elements.

10. The apparatus of claim 9, wherein, the pivot drive element comprises a pivot torque motor, having first and second members thereof operatively connected for rotation relative to one another about a pivot torque motor axis extending substantially coincident with the common pivot axis, the first member of the pivot torque motor being fixedly attached to the first wrist element, and the second member of the pivot torque motor being fixedly attached to the second wrist element.

11. The apparatus of claim 10, further comprising, a redirect arrangement operatively connected to the wrist apparatus.

12. The apparatus of claim 11, wherein the redirect arrangement further comprises, a wrist pivot angle redirect arrangement including a guide which is operatively mounted along the common pivot axis, for directing a plurality of fiber tows passing through the wrist apparatus, in such a manner that:

when the rotational axes of the first and second wrist elements are coincident, at a pivot angle of zero degrees, no angular redirection of the tows is provided about the pivot axis; and when the rotational axes are not coincident at a non-zero pivot angle, the fiber tows are angularly redirected about the pivot axis through a pivot redirect angle substantially equal to the non-zero pivot angle.

13. The apparatus of claim 12, further comprising a pivot angle redirect drive apparatus, operatively connected between at least one of the first and second wrist elements and the pivot angle redirect arrangement, for driving the pivot angle redirect in such a manner that the fiber tows are angularly redirected about the pivot axis through a pivot redirect angle having a value of substantially one-half of the pivot angle, by rotation of the pivot angle redirect arrangement substantially equal to one-half of the pivot angle.

14. The apparatus of claim 13, wherein, the pivot torque motor has an additional output thereof operatively attached to the pivot angle redirect and comprising the pivot angle redirect drive.

15. The compact fiber placement apparatus of claim 11, wherein the redirect arrangement further comprises:
- a fiber tow guide having a plurality of substantially axially oriented passages extending therethrough for guiding a plurality of tows through the opening in the head rotation torque motor;
- the fiber tow guide being rotatably mounted within the head rotation torque motor in a manner allowing the fiber tow guide to rotate freely with respect to the head rotation torque motor about the rotational axis of the head rotation torque motor.

16. The compact fiber apparatus of claim 15, wherein, the fiber tow guide comprises:
- a substantially circular cylindrical member, operatively rotatably mounted within the head rotation torque motor in a manner allowing the cylindrical member to rotate freely about the rotational axis of the head rotation torque motor; and
- a guide bar fixedly attached to the cylindrical member of the fiber tow guide, with the guide bar including the plurality of substantially axially oriented passages extending therethrough for guiding the plurality of tows through the opening in the head rotation torque motor and the opening in the base of the second wrist element.

17. The compact fiber placement apparatus of claim 16, wherein the redirect arrangement further comprises:
- an additional fiber tow guide having a plurality of substantially axially oriented passages extending therethrough for guiding a plurality of tows through the opening in the wrist rotation torque motor;
- the additional fiber tow guide being operatively rotatably connected to the second member of the wrist rotation torque motor in a manner allowing the additional fiber tow guide to rotate freely with respect to the wrist rotation torque motor, about the rotational axis of the wrist rotation torque motor.

18. The compact fiber placement apparatus of claim 17, further comprising, a wrist mounting adaptor, having a first mounting surface thereof adapted for fixed attachment to the fiber placement machine, and a second mounting surface thereof adapted for fixed attachment thereto of the second member of the wrist rotation, torque motor.

19. The compact fiber placement apparatus of claim 17, further comprising:
- a wrist mounting adaptor, having a first mounting surface thereof adapted for fixed attachment to the fiber placement machine, and a second mounting surface thereof adapted for fixed attachment thereto of the second member of the wrist rotation torque motor;
- the additional fiber tow guide being operatively rotatably connected to the wrist mounting adaptor, in a manner allowing the additional fiber tow guide to rotate freely with respect to the wrist rotation torque motor, and the wrist mounting adaptor, about the rotational axis of the wrist rotation torque motor.

20. The compact fiber placement apparatus of claim 4, wherein, the first and second wrist elements are each generally L-shaped, single-tined, forks having a support arm extending substantially perpendicularly from their respective bases, with the support arms being operatively pivotably joined for pivotable movement of the first and second wrist elements about the common pivot axis.

21. The compact fiber placement apparatus of claim 20, further comprising:
- a first and a second removable support arm, each having an attachment end and a distal end thereof, with the distal ends thereof being operatively attached to one another for independent pivotable moment of the first and second removable support arms, with respect to one another, about the common pivot axis;
- the first removable support arm having the attachment end thereof adapted for removable attachment to the base of the first wrist element, opposite and spaced along the pivot axis from the support arm of the first wrist element; and
- the second removable support arm having the attachment end thereof adapted for removable attachment to the base of the second wrist element, opposite and spaced along the pivot axis from the support arm of the second wrist element.

* * * * *